United States Patent [19]

Fujita et al.

[11] Patent Number: 4,971,164

[45] Date of Patent: Nov. 20, 1990

[54] CONTROLLER FOR REDUCING ACCELERATION SLIPPAGE OF A DRIVEN WHEEL

[75] Inventors: Kozo Fujita; Kiyotaka Ise, both of Susono, Japan

[73] Assignee: Toyota Jidosha Kabushiki Kaisha, Aichi, Japan

[21] Appl. No.: 307,946

[22] Filed: Feb. 9, 1989

[30] Foreign Application Priority Data

Feb. 16, 1988 [JP] Japan .................................. 63-33740

[51] Int. Cl.⁵ .............................................. B60K 28/16
[52] U.S. Cl. .................................. 180/197; 364/426.03
[58] Field of Search ............... 180/197, 233; 361/238; 364/426.02, 426.03; 303/95, 100, 103

[56] References Cited

U.S. PATENT DOCUMENTS

| | | | |
|---|---|---|---|
| 4,637,487 | 1/1987 | Nakamura et al. | 180/197 |
| 4,721,176 | 1/1988 | Kabasin et al. | 180/197 |
| 4,722,411 | 2/1988 | Ohashi et al. | 180/197 |
| 4,736,814 | 4/1988 | Yogo et al. | 180/197 |
| 4,739,855 | 4/1988 | Inagaki et al. | 180/197 |
| 4,739,856 | 4/1988 | Inagaki et al. | 364/426.03 X |
| 4,760,893 | 8/1988 | Sigl et al. | 180/197 |
| 4,766,972 | 8/1988 | Takata et al. | 180/197 |
| 4,785,904 | 11/1988 | Leiber et al. | 180/197 |
| 4,788,644 | 11/1988 | Inagaki | 364/426.03 |
| 4,811,808 | 3/1989 | Matsumoto et al. | 180/197 |
| 4,843,552 | 6/1989 | Inagaki | 364/426.03 |
| 4,856,610 | 8/1989 | Leiber et al. | 180/197 |
| 4,860,847 | 8/1989 | Shibaishi et al. | 180/197 |
| 4,866,623 | 9/1989 | Ise et al. | 180/197 |
| 4,873,638 | 10/1989 | Shibaishi et al. | 180/197 |

FOREIGN PATENT DOCUMENTS

| | | |
|---|---|---|
| 3206694 | 9/1983 | Fed. Rep. of Germany . |
| 60-128057 | 7/1985 | Japan . |
| 61-1543 | 1/1986 | Japan . |
| 61-85248 | 4/1986 | Japan . |
| 61-283736 | 12/1986 | Japan . |
| 62-67257 | 3/1987 | Japan . |
| 62-149545 | 7/1987 | Japan . |

*Primary Examiner*—Mitchell J. Hill
*Attorney, Agent, or Firm*—Oliff & Berridge

[57] ABSTRACT

A controller for reducing acceleration slippage of a driven wheel starts the throttle-valve control, the brake control, and the engine output torque control when acceleration slippage is detected. The output torque control is executed together with the brake control for a limited period after the detection of acceleration slippage, thus compensating for the slow effect of the throttle-valve control on the output torque. The controller quickly reduces acceleration slippage without adversely affecting the engine operation.

23 Claims, 14 Drawing Sheets

| THROTTLE OPENING θ [%] | ENGINE SPEED NE (×100rpm) | | | | | | |
|---|---|---|---|---|---|---|---|
| | 0 | 4 | 8 | 12 | 16 | | |
| 0 | 1 | 1 | 1.2 | 1.4 | 1.6 | --- | --- |
| 5 | 1.4 | 1.4 | 1.3 | 1.3 | 1.4 | --- | --- |
| 10 | 2 | 2.1 | 2.2 | 2 | 1.8 | --- | --- |
| 15 | 4 | 4 | 4 | 2.8 | 3 | --- | --- |
| 20 | 4 | 4 | 4 | 4 | 3.5 | --- | --- |
| 25 | 4 | 4.5 | 5 | --- | --- | --- | --- |
| --- | --- | --- | --- | --- | --- | --- | --- |

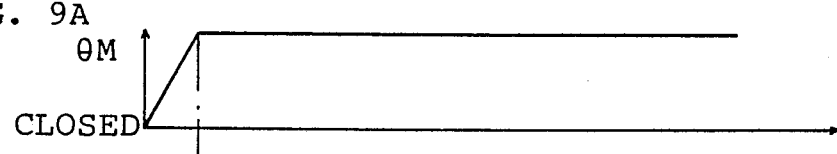
FIG. 9A
θM
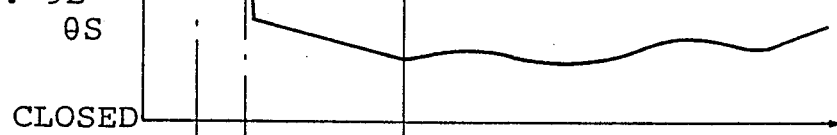
FIG. 9B
θS
FIG. 9C
PB
FIG. 9D
TR
FIG. 9E
V(Speed)
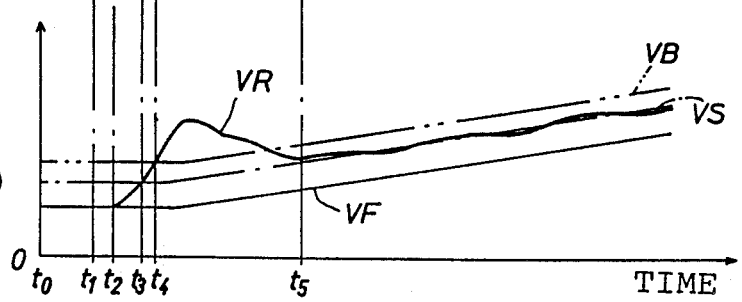

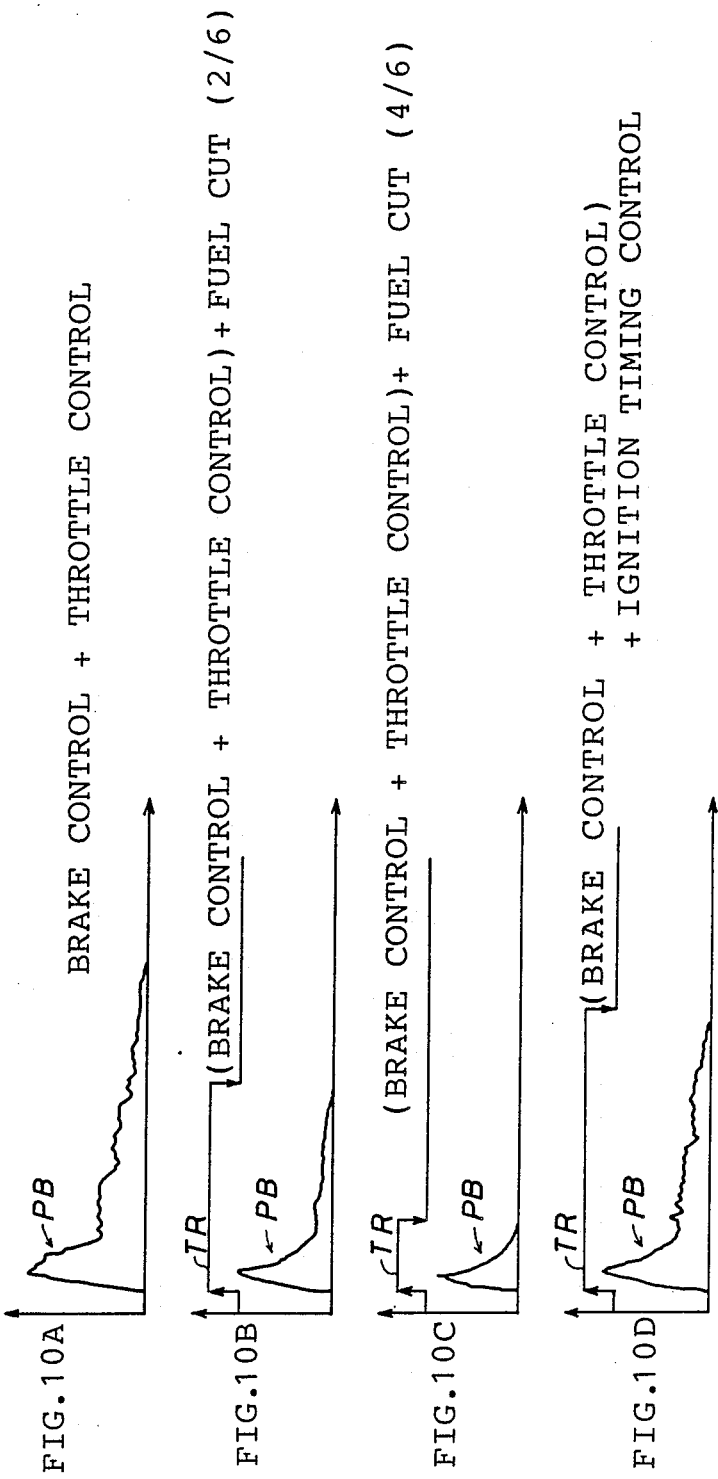

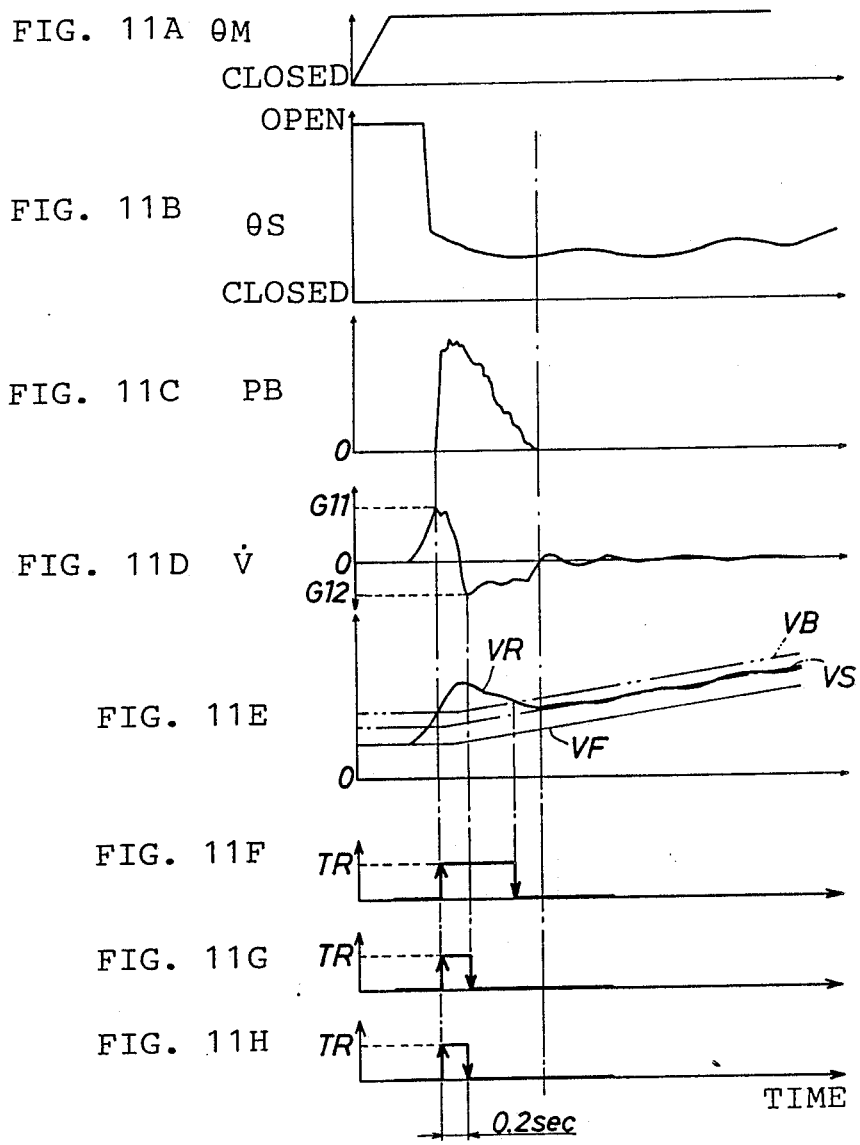

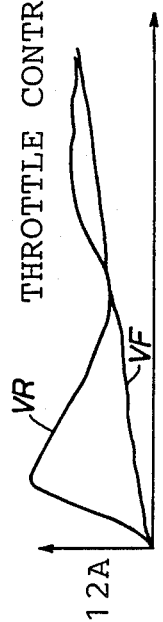
FIG. 12A THROTTLE CONTROL ONLY
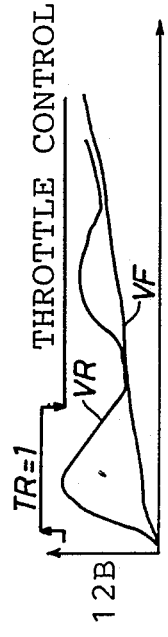
FIG. 12B THROTTLE CONTROL + FUEL CUT (2/6)
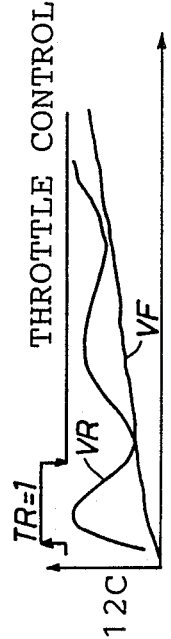
FIG. 12C THROTTLE CONTROL + FUEL CUT (4/6)
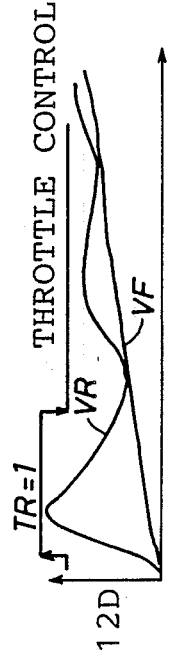
FIG. 12D THROTTLE CONTROL + IGNITION TIMING CONTROL

CONTROLLER FOR REDUCING ACCELERATION SLIPPAGE OF A DRIVEN WHEEL

BACKGROUND OF THE INVENTION

This invention relates to an acceleration-slippage controller for reducing slippage that occurs between the driven wheel and the road surface during vehicle acceleration.

One example of the prior-art controllers for reducing the acceleration slippage is Japanese Published Unexamined Patent Application S62-67257. When acceleration slippage occurs at a driven wheel, this controller executes both the throttle-valve control and the ignition-timing delay control to reduce the output torque of the engine and slow the revolution of the driven wheel. This device has been contrived because the throttle-valve control and the ignition-timing delay control are individually inadequate because of the respective shortcomings set forth below:

(1) The throttle-valve control cannot quickly lower the output torque of the engine to slow the driven wheel's revolution.

(2) The ignition delay control can alter the engine output torque only to a limited range. When the vehicle is running on a road surface with little friction such as a snow-covered road, it cannot reduce the output torque to less than the critical torque causing the slippage.

When the throttle-valve control and the ignition-timing delay control are started together as in the discussed prior art, each one of them compensates for the other's shortcoming, thus preferably reducing the acceleration slippage by the driven wheel over a wide range of operating conditions.

In the prior-art controller described above, however, the operation of the engine would deteriorate when the two controls are simultaneously executed until the acceleration slippage ends. Although the ignition-timing delay control can reduce the engine output torque quickly, long-term execution of this control raises the exhaust gas temperature, which eventually deteriorates the emission catalyst in the exhaust system. An engine that lowers the exhaust gas temperature by increasing the amount of the fuel supplied to the engine wastes fuel.

The rapid reduction in the engine output torque can also be achieved by the occasional interruption of the fuel supply to each cylinder, instead of by the ignition-timing delay control. Such fuel supply control, however, causes irregular revolution of the engine. The operation of the engine is also adversely affected by such fuel supply omission control.

U.S. Pat. No. 4,721,176 discloses a traction control (acceleration-slippage control) system in which the torque control is used to compensate for a delay in the air flow control. In this prior art, the torque control is executed for a fixed period regarding the delay. Although longer torque control has an adverse effect on the engine conditions such as emission, it is not always appropriate to stop the torque control regardless of the slippage or the slippage control.

SUMMARY OF THE INVENTION

An object of the invention is, therefore, to provide an acceleration-slippage controller that reduces acceleration slippage using the engine output torque control and the throttle-valve control, and that maintains the operation of the engine in a stable and ideal condition.

This object is achieved by the present invention as schematically illustrated in FIG. 1. According to the invention, a controller for reducing acceleration slippage at a driven wheel M1 of an automobile with an internal combustion engine M4 comprises: a slippage detecting means M2 for detecting slippage of the driven wheel M1 when the automobile is accelerating; a throttle-valve control means M6 for adjusting an opening of a sub-throttle valve M5 of the engine M4 to reduce the slippage when the detected slippage exceeds a first reference value; and a torque reducing means M7 for reducing the output torque of the engine M4 to reduce the slippage by adjusting an ignition timing of the engine M4 during the first occurrence period while the detected slippage exceeds a second reference value which is greater than the first reference value.

In the acceleration controller of the present invention, the slippage detecting means M2 detects slippage of the driven wheel M1 when the automobile is accelerating. The throttle-valve control means M 6 starts control when the detected slippage exceeds a first reference value. The torque reducing means M7 starts control when the detected slippage exceeds a second reference value that is greater than the first reference value. The torque reducing means M7 quickly lowers the output torque of the engine M4, thus slowing the revolution of the driven wheel M1. After a predetermined period, the torque reducing means M7 ends the reduction of the output torque of the engine M4. Then, the throttle-valve control means M6 reduces the engine output torque by decreasing the air supply to the engine M4. The revolution of the driven wheel M1 is thus constantly reduced.

In this slippage controller, the torque reducing means M7 executes its control for a limited period immediately after the occurrence of acceleration slippage, when the throttle-valve control means M6 cannot reduce the output torque of the engine M4 quickly enough. The controller of this invention, therefore, reduces acceleration slippage without causing any adverse effects on the engine such as raising the exhaust gas temperature.

BRIEF EXPLANATION OF THE DRAWINGS

FIGS. 9A, 9B, 9C, 9D and 9E are timing charts for showing the main throttle valve opening $\theta M$ (FIG. 9A), sub-throttle valve opening $\theta S$ (FIG. 9B), brake oil pressure PB in the wheel cylinders of driven wheels (FIG.

9C), torque control signal TR (FIG. 9D), and driven-wheel speed VR (FIG. 9E) in the acceleration-slippage control.

FIGS. 10A, 10B, 10C, and 10D are timing charts for showing the effects of the engine output torque control on the brake oil pressure.

FIGS. 11A, 11B, 11C, 11D, 11E, 11F, 11G, and 11H are timing charts similar to FIGS. 9A–9E for showing other output timing of the torque control signal.

FIGS. 12A, 12B, 12C and 12D are timing charts for showing the effects of the engine output torque control on the driven-wheel speed.

DETAILED DESCRIPTION OF A PREFERRED EMBODIMENT

One embodiment of the present invention is a rear-wheel-drive vehicle equipped with the acceleration-slippage controller of this invention. When acceleration slippage occurs, the acceleration-slippage controller of this embodiment executes engine output control and brake control: the former reduces the output torque of the engine by adjusting the throttle valve opening, and by controlling the ignition timing and the fuel supply; and the latter reduces the rotation of a driven wheel by operating a braking device of the wheel.

Figure 1:
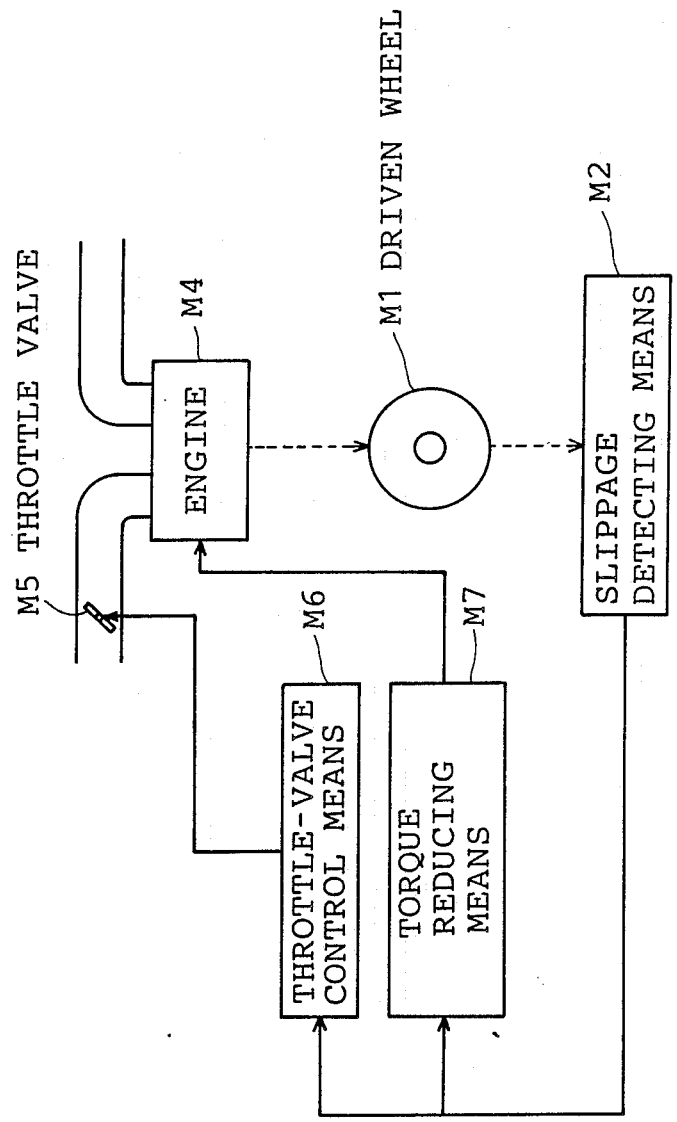
FIG. 1 is a block diagram showing a basic structure of this invention.
Figure 2:
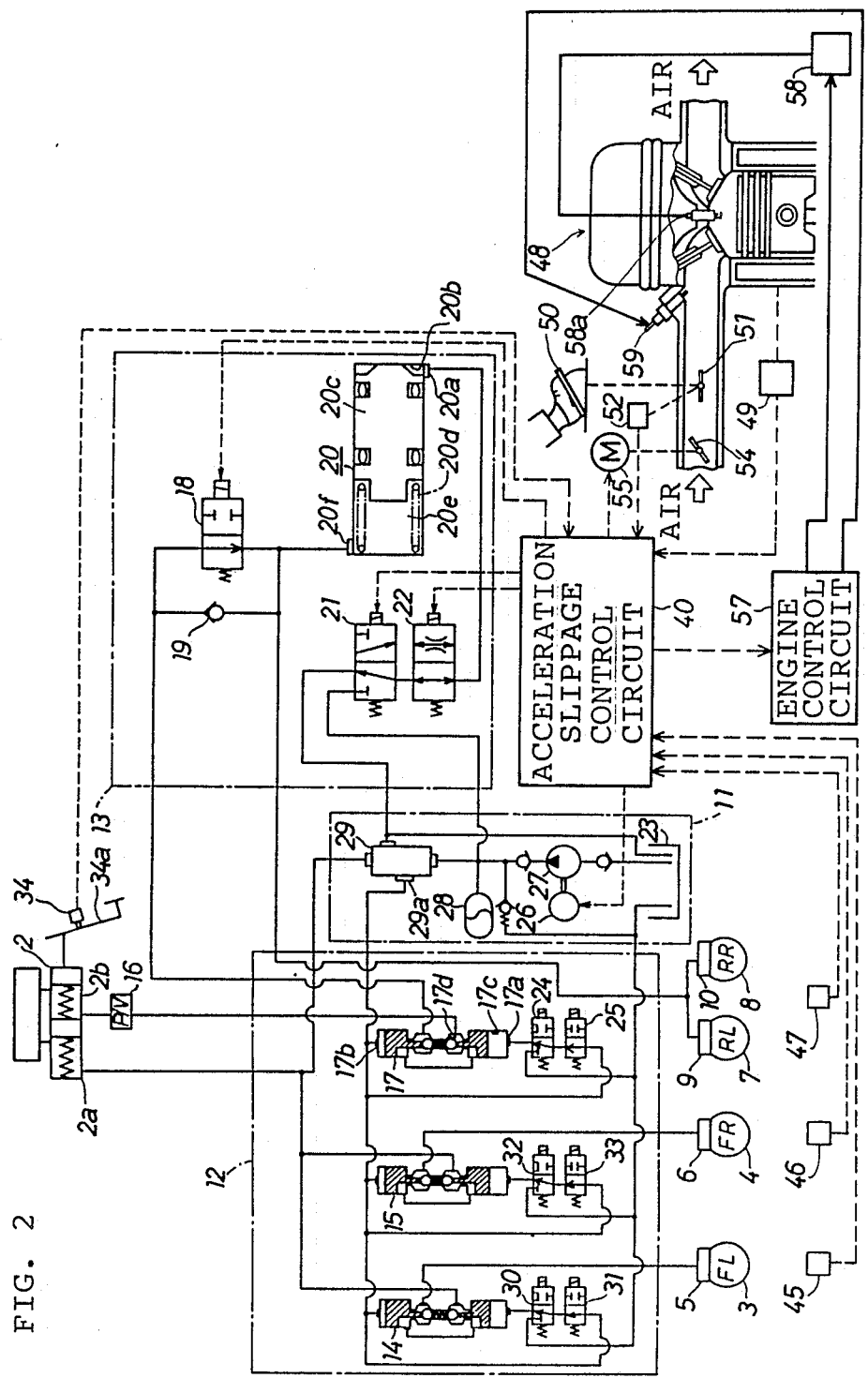
FIG. 2 is a schematic diagram of a rear-wheel-drive vehicle embodying an acceleration-slippage controller of this invention.

First, the brake system is explained. In FIG. 2, the oil brake system includes: a brake master cylinder 2; left and right front wheel cylinders 5 and 6 for the non-driven wheels 3 and 4; left and right rear wheel cylinders 9 and 10 for the driven wheels 7 and 8; an oil pressure source 11; an oil circuit 12 for anti-skid control; and another oil circuit 13 for the acceleration-slippage control. The oil pressure source 11 and the oil circuits 12 and 13 are between the master cylinder 2 and the wheel cylinders 5, 6, 9 and 10.

Between a first chamber $2a$ of the brake master cylinder 2 and the wheel cylinders 5 and 6 of the left and the right front wheels 3 and 4 are left and right front volume control valves 14 and 15, respectively, for the anti-skid control. Between a second chamber $2b$ of the brake master cylinder 2 and the wheel cylinders 9 and 10 of the left and right rear wheels 7 and 8 are: a proportional valve 16; a rear volume-control valve 17 for the anti-skid control; a first solenoid valve 18 and a check valve 19 that are in parallel; and a volume-control valve 20 for the acceleration-slippage control.

During anti-skid execution, the first solenoid valve 18 is not energized but rests at the position shown in FIG. 2, allowing communication between the anti-skid volume-control valve 17 and the acceleration-slippage volume-control valve 20. A second solenoid valve 21 and a third solenoid valve 22, sequentially connected to a control input port $20a$ of the acceleration-slippage volume-control valve 20, are not energized but rest at the position shown in FIG. 2, allowing communication between a pressure control chamber $20b$ and a reservoir 23 of the oil pressure source 11.

A piston $20c$ of the acceleration-slippage volume-control valve 20 is biased by a spring $20d$ into the position as shown in FIG. 2. At this time, the anti-skid volume-control valve 17 moves into one of three states depending on the energized or de-energized states of a first rear change valve 24 connected to a first control input port $17a$ of the anti-skid volume-control valve 17, and of a second rear change valve 25 sequentially connected to the first change valve 24. The three states are as follows:

(A1) An output port $29a$ of a regulator 29 and the first control input port $17a$ communicate. Here, the regulator 29 modulates the oil pressure from an oil pump 27 or from an accumulator 28 of the oil pressure source 11 according to the brake pedal position. The oil pump 27 is driven by an oil pump motor 26.

(A2) The first input port $17a$, regulator 29 and reservoir 23 are disconnected from one another.

(A3) The first input port $17a$ and the reservoir 23 communicate.

A second control input 17b of the rear anti-skid volume control valve 17 always communicates with the output port $29a$ of the regulator 29. Therefore, the rear anti-skid volume control valve 17 responds to the above three states as follows. The oil pressure within a first oil chamber $17c$ having the first input port $17a$ is: (A1) increased, (A2) maintained, or (A3) decreased. The volume of a brake pressure chamber $17d$ changes according to the pressure in the first oil chamber $17c$. Through this mechanism, the rear anti-skid volume control valve 17: (A1) increases, (A2) maintains, or (A3) decreases the pressure in the left and right rear wheel cylinders 9 and 10 via the first solenoid valve 18 and the check valve 19. Similarly, the left and right front anti-skid volume control valves 14 and 15 work against the left and right front wheel cylinders 5 and 6 depending on the energized or de-energized states of left front first and second change valves 30 and 31 and right front first and second change valves 32 and 33. The first and second change valves 24, 25, 30, 31, 32 and 33 are energized or de energized by an anti-skid control circuit (not shown).

During the acceleration-slippage control, the first solenoid valve 18 is energized to move into a right side position in FIG. 2, which blocks the oil path. This cuts the communication between the rear anti-skid volume-control valve 17 and the acceleration-slippage volume-control valve 20 due to the first solenoid valve 18 and the check valve 19. At this time, the acceleration-slippage volume-control valve 20 moves into one of four states, as follows, depending on the energized or de-energized states of the second and third solenoid valves 21 and 22, which are sequentially connected to the control input port $20a$.

(B1) The accumulator 28 and the control input port $20a$ communicate without resistance.

(B2) The accumulator 28 and the control input port $20a$ communicate via a throttle valve of the third solenoid valve 22.

(B3) The reservoir 23 and the control input port $20a$ communicate via the throttle valve of the third solenoid valve 22.

(B4) The reservoir 23 and the control input port $20a$ communicate without resistance.

The acceleration-slippage volume-control valve 20 responds to the above four states as follows. The pressure in the pressure control chamber $20b$ having the control input port $20a$: (B1) quickly increases, (B2) slowly increases, (B3) slowly decreases, or (B4) quickly decreases. This change of the pressure alters the volume of the pressure control chamber $20b$ and moves the piston $20c$ to the right or left in FIG. 2 against the force of the spring $20d$. With this movement of the piston $20c$, oil pressure is supplied from an output port $20f$ of a brake oil pressure chamber $20e$ to the left and right rear wheel cylinders 9 and 10, making the pressure within the wheel cylinders 9 and 10: (B1) quickly increase, (B2) slowly increase, (B3) slowly decrease, or (B4) quickly decrease, all according to the above four states of the acceleration-slippage volume-control valve 20.

Acceleration slippage is controlled by a control circuit 40. The acceleration-slippage control circuit 40 connects to: a pedal switch 34 for generating an ON signal when a brake pedal 34a is pressed; a left front wheel speed sensor 45, a right front wheel speed sensor 46 and a rear wheel speed sensor 47 for sensing the revolution speed of the left front wheel 3, the right front wheel 4 and the rear wheels 7 and 8, respectively; an engine speed sensor 49 for sensing the revolution speed of an engine 48; and a throttle position sensor 52 for sensing the opening of a main throttle valve 51 of the engine 48 that opens or closes according to the status of an accelerator pedal 50. The output signals from the switch and sensors are transmitted to the acceleration-slippage control circuit 40, which then detects acceleration slippage and drives the first, second and third solenoid valves 18, 21 and 22, respectively, and the oil pump motor 26 for the above-explained brake control of the rear wheels.

The acceleration-slippage control circuit 40 further connects to a drive motor 55 of a sub-throttle valve 54 provided sequentially with the main throttle valve 51 in an intake pipe of the engine 48, and also connects to an engine control circuit 57 that controls both the ignition timing and a fuel injection amount of the engine 48. When acceleration slippage occurs, the acceleration-slippage control circuit 40 directly controls the opening of the sub-throttle valve 54, and indirectly controls the output torque of the engine 48 through the engine control circuit 57.

The engine control circuit 57 is a microcomputer including a CPU, ROM and RAM. It receives detection signals from several sensors which detect the operational condition of the engine 48. According to the detection signals, the engine control circuit 57 controls both a timing of an ignition device 58 for applying high voltage to a spark plug 58a (i.e., the ignition timing) and a period for opening a fuel injection valve 59, the period determining the fuel amount injected to the engine 48. When acceleration slippage occurs, the acceleration-slippage control circuit 40 sends a torque control signal to the engine control circuit 57 to delay the ignition timing and to reduce the fuel amount for the engine 48. Thus, the engine torque is quickly reduced.

Figure 3:
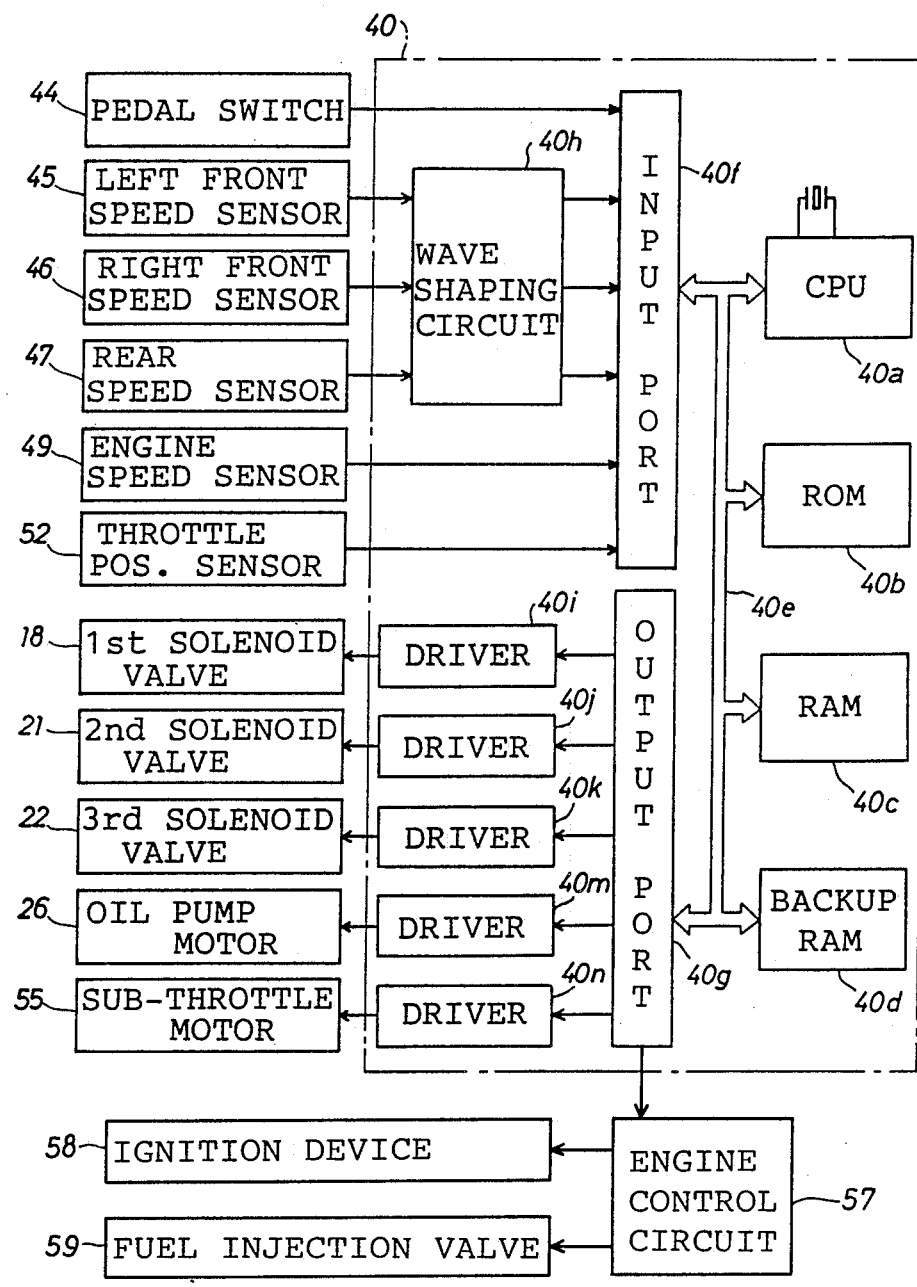
FIG. 3 is an electrical block diagram of the acceleration-slippage control circuit of the embodiment.

As shown in FIG. 3, the acceleration-slippage control circuit 40 is a microcomputer including: a CPU 40a, ROM 40b, RAM 40c, backup RAM 40d, input and output ports 40f and 40g, respectively, an interconnecting bus 40e, wave shaping circuit 40h, and driver circuits 40i, 40j, 40k, 40m, and 40n for solenoid valves and motors. The pedal switch 34, the engine speed sensor 49 and the throttle position sensor 52 directly connect to the input port 40f. The speed sensors 45, 46 and 47 for the left front, right front, and rear wheels, respectively, connect to the input port 40f via the wave shaping circuit 40h. The CPU 40a receives signals from these switches and sensors via the input port 40f, processes them, and sends control signals to the first, second, and third solenoid valves 18, 21, and 22, oil pump motor 26 and sub-throttle valve motor 55 via the output port 40g and the driver circuits 40i, 40j, 40k, 40m and 40n. The output port 40g also connects to the engine control circuit 57 so that the acceleration-slippage control circuit 40 sends the torque control signal to the engine control circuit 57 for the execution of the ignition-timing delay and the fuel reduction.

Referring to FIGS. 4A, 4B, 5, 6, and 7, we explain the acceleration-slippage control executed in the acceleration-slippage control circuit 40 and the output torque control executed in the engine control circuit 57 during the acceleration-slippage control.

Throughout the acceleration-slippage control, the acceleration-slippage control circuit 40 directly adjusts the opening of the sub-throttle valve 54 to suppress slippage. When the slippage of the driven wheel greatly increases (e.g., immediately after acceleration slippage begins), the acceleration-slippage control circuit 40 also controls the brake system. Moreover, the acceleration-slippage control circuit 40 executes output torque control for the engine 48 through the engine control circuit 57 for a limited period immediately after the acceleration slippage.

Figure 4A:
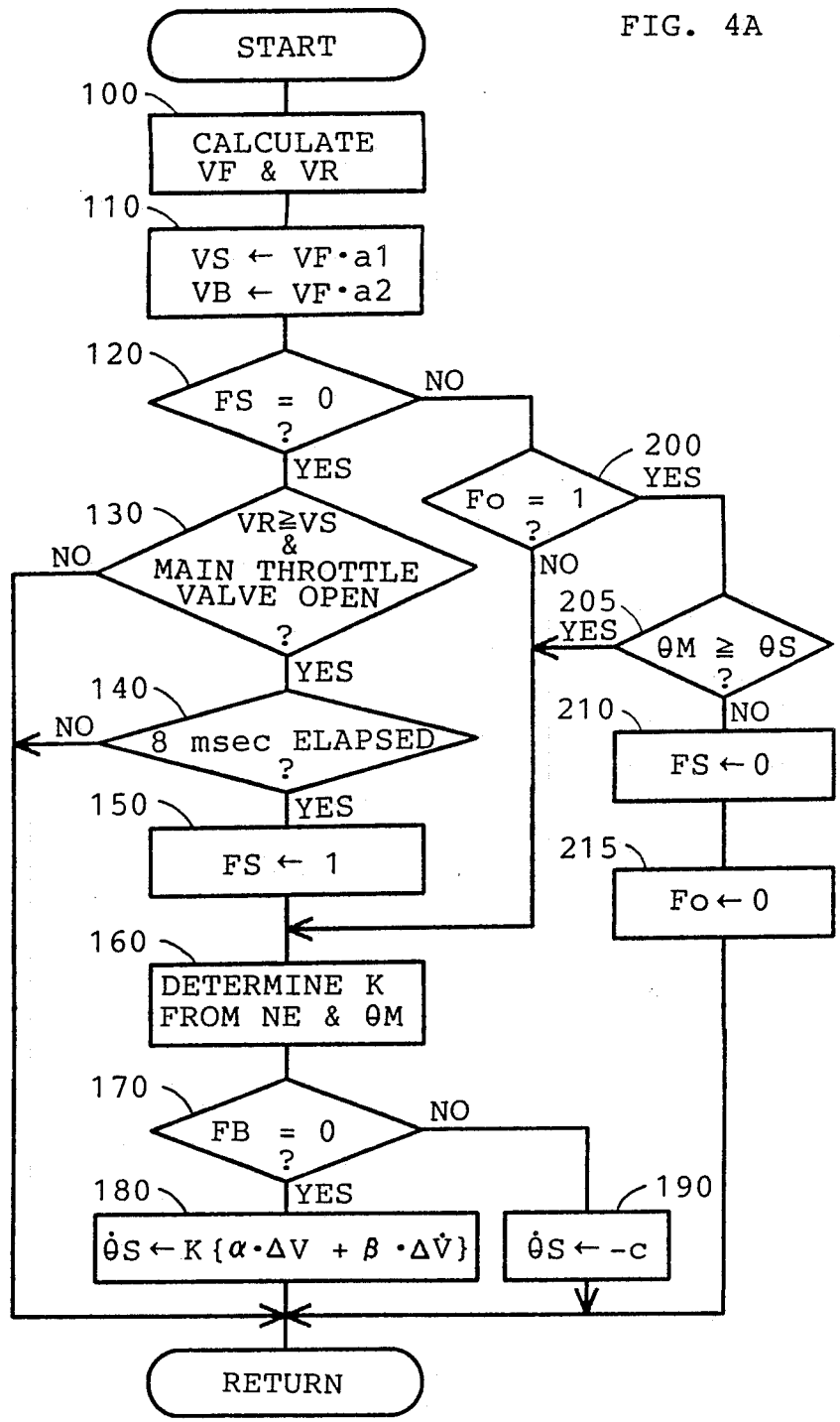
FIGS. 4A and 4B are flow charts of a sub-throttle valve control routine.
Figure 4B:
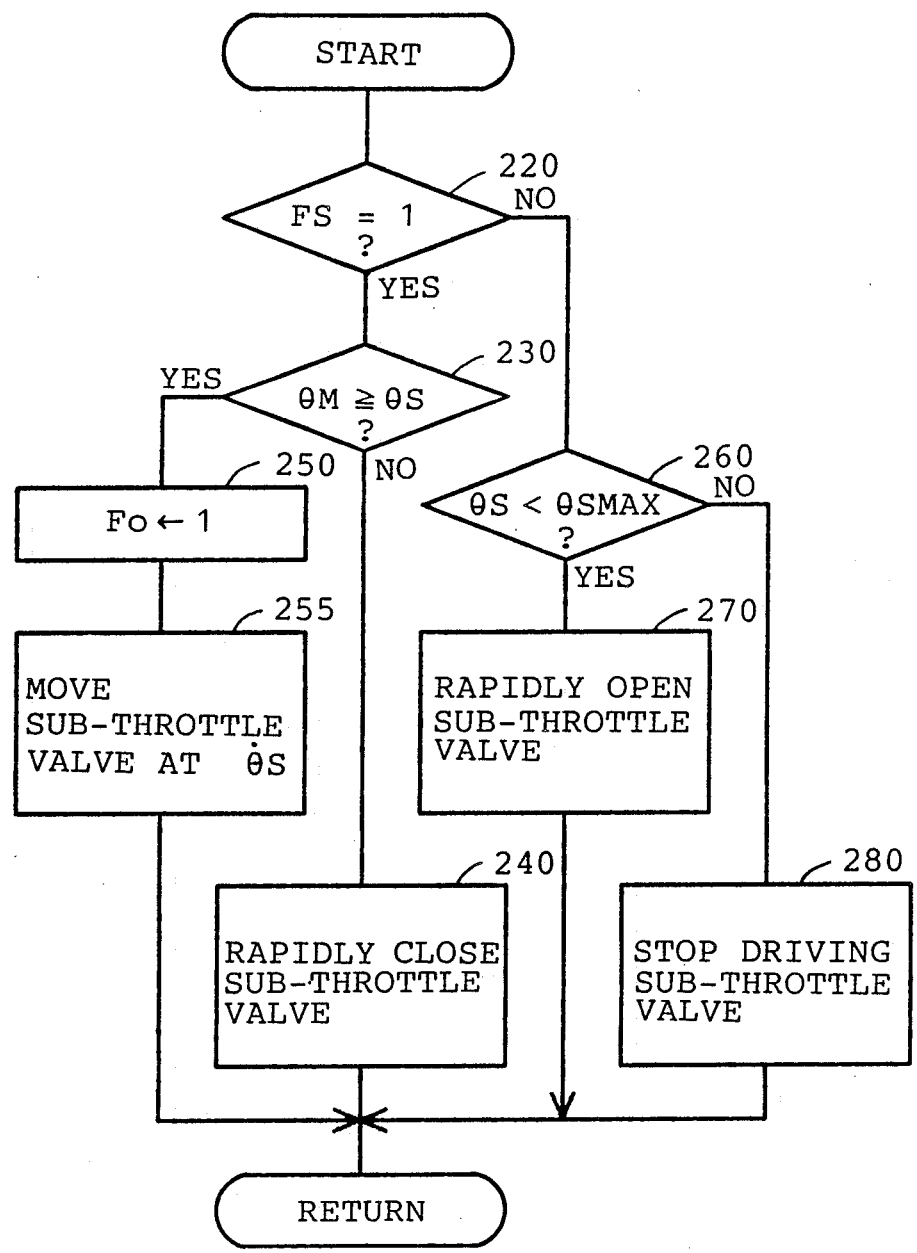

The flow charts of FIGS. 4A and 4B show a process of adjusting the opening of the sub-throttle valve 54, which repeats in the acceleration-slippage control circuit 40 at predetermined intervals. More specifically, FIG. 4A shows a process of calculating a control amount for the sub-throttle valve 54, and FIG. 4B shows a process for driving the sub-throttle valve 54.

When the routine of FIG. 4A starts, a vehicle speed VF and a driven-wheel speed VR are calculated at step 100 based on the detection signals from the left front, right front, and rear wheel speed sensors 45, 46, and 47. The vehicle speed VF is calculated by multiplying the average value of outputs of the left and right front speed sensors 45 and 46 (or greater of the two outputs) by the peripheral length of a front wheel. The driven-wheel speed VR is calculated by multiplying an output of the rear wheel rotational speed sensor 47 by the peripheral length of a rear wheel. From the vehicle speed VF, a first reference value VS for the control of the sub-throttle valve and a second reference value VB for the control of the brake system are calculated at step 110 as follows.

$$VS = VF \cdot a1 \quad (1)$$

$$VB = VF \cdot a2 \quad (2)$$

Here, a1 and a2 are coefficients (reference slip rate), both greater than one, such that a1 < a2. Since the value VS is a target peripheral speed for the driven wheels 7 and 8 in this acceleration-slippage control, the value a1 is selected such that the driving force (or traction force) of the driven wheel on the road is at its maximum. For example, the value a1 ranges from 1.12 to 1.20. Instead of the above formulae (1) and (2), the following equations may be used to determine the reference values VS and VB.

$$VS = VF + b1 \quad (3)$$

$$VB = VF + b2 \quad (4)$$

where, $0 < b1 < b2$.

Then, at step 120, it is determined whether the value of a flag FS is zero: the flag FS is set to one when the sub-throttle-valve control is executed, and is reset to zero when the sub-throttle valve control is not executed. When FS=0, it is then determined at step 130 whether the condition to start the acceleration-slippage control exists. Specifically, it is determined whether the driven-wheel speed VR exceeds the reference value VS and whether the main throttle valve 51 is not completely closed. When this condition does not exist at step 130, no further processing occurs. When the condition exists, the process proceeds to step 140.

The acceleration-slippage control does not begin until a predetermined period (e.g., 8 msec) elapses at step 140. The delay at step 140 is introduced because the sub-throttle control should not be started when the driven wheels 7 and 8 are coasting over sporadic irregularities in the road surface.

Figure 8A:
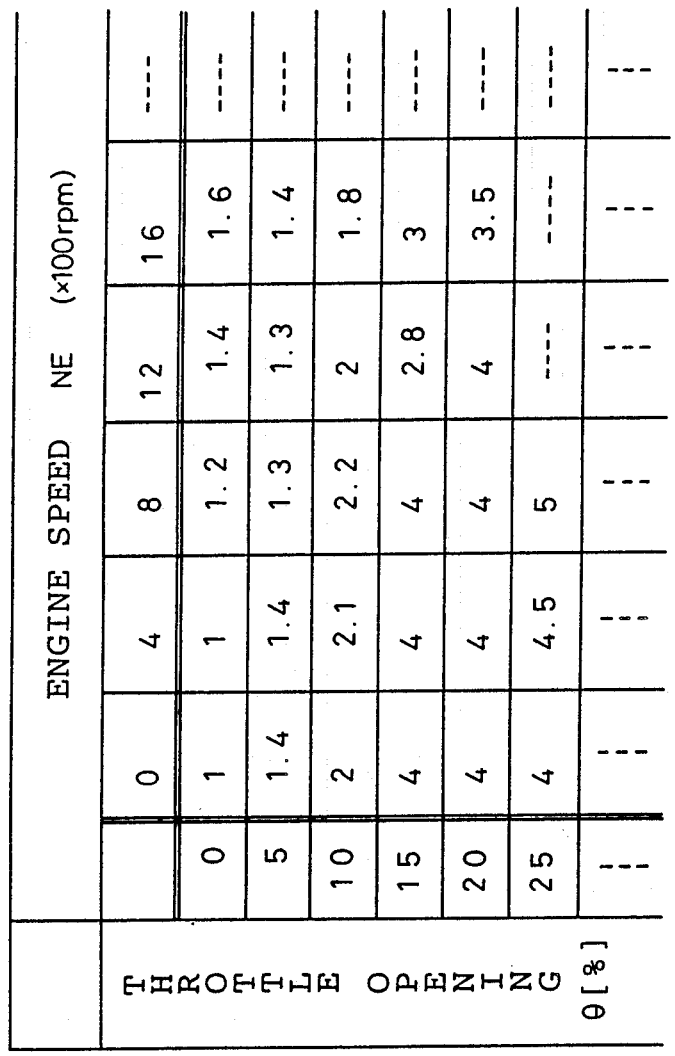
FIG. 8A shows a part of a table for determining a correction factor K for use in the calculation of sub-throttle valve opening speed.
Figure 8B:
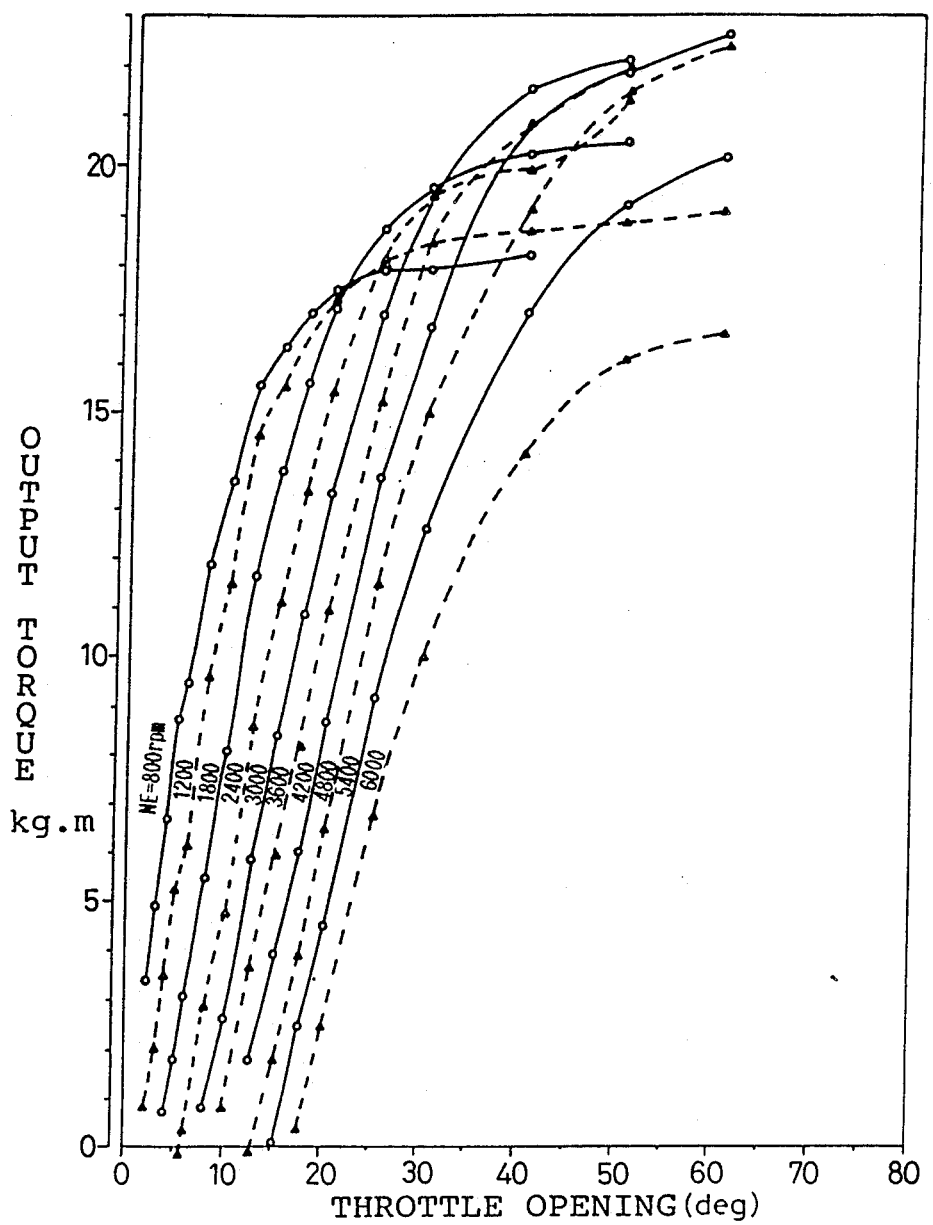
FIG. 8B is a graph showing the relationship between the throttle valve opening and the engine output torque.

After the 8-msec delay elapses, the flag FS is set to one at step 150, and then a correction factor K is determined at step 160 by an interpolation from a table stored in the ROM 40b, as partially shown in FIG. 8A, based on the revolution speed NE of the engine 48 and on a throttle valve opening $\theta$. The correction factor K is introduced to compensate for the nonlinear relationship between the throttle valve opening $\theta$ and the engine output torque, as shown in FIG. 8B. As seen in FIG. 8B, the output torque quickly responds to a narrow opening of a throttle valve, but hardly responds to further opening of the valve at all. The correction factor K, therefore, prevents an excessive opening of the sub-throttle valve 54 and maintains sharp responsiveness while the sub-throttle valve opening is adjusted.

For calculation of the correction factor K, the throttle opening $\theta$ is the opening $\theta M$ of the main throttle valve when the opening $\theta M$ is less than the opening $\theta S$ of the sub-throttle valve 54 (e.g., at the beginning of the slippage control). Alternatively, the throttle opening $\theta$ is the opening $\theta S$ of the sub-throttle valve 54 when $\theta S$ is less than $\theta M$ after the throttle-valve control, described later, is started.

After step 160, it is determined at step 170 whether the value of a flag FB is zero: the flag FB is set to one when the brake control is executed, and is reset to zero when the control is not executed. When FB=0, a control amount $\dot{\theta}S$ for the sub-throttle valve 54 is calculated at step 180 by the following equation (5). The control amount $\dot{\theta}S$ is a time derivative of the sub-throttle opening $\theta S$, and it is the target speed for driving the sub-throttle valve motor 55.

$$\dot{\theta}S = K \cdot \{\cdot \Delta V + \beta \cdot \Delta \dot{V}\} \tag{5}$$

Here: $\alpha$ is a proportional gain; $\beta$ is a differential gain; $\Delta V$ is a difference (VS−VR) between the reference driven-wheel speed VS and the actual driven-wheel speed VR; and $\Delta \dot{V}$ is its time derivative. The opening of the sub-throttle valve 54 is, therefore, adjusted such that the actual driven-wheel speed VR approximates the reference value VS while the brake control is not executed.

When it is determined at step 170 that the brake control is executed (FB=1), the control amount $\dot{\theta}S$ is substituted by a predetermined negative value −c so that the sub-throttle valve 54 is closed at a predetermined speed c. This is because the driven-wheel speed VR, especially its differential value $\dot{V}R$, responds very quickly to the brake control: if the control amount $\dot{\theta}S$ is determined according to the equation (5) using the difference $\Delta V$ (=VS−VR) and its differential value $\Delta \dot{V}$, a hunting of the sub-throttle opening might occur during the brake control. The fixed closing speed c for the sub-throttle valve 54 can prevent the brake control and the sub-throttle opening control from disturbing each other.

After the control amount $\dot{\theta}S$ for the sub-throttle valve 54 is determined as described above, the routine ends.

When FS=1 at step 120, indicating that the sub-throttle-valve control is under way, it is subsequently determined at step 200 whether the value of a flag Fo is one: the flag Fo is set to one when the opening $\theta S$ of the sub-throttle valve 54 becomes equal to or less than the opening $\theta M$ of the main throttle valve 51 in a flow chart of FIG. 4B described later. If Fo=0 at step 200, the process goes to step 160. If Fo=1, indicating that $\theta S$ has become less than $\theta M$, then it is determined at step 205 whether the sub-throttle opening $\theta S$ is now equal to or greater than the main throttle opening $\theta M$. If $\theta M \geq \theta S$, the flow goes to step 160 the calculation of the control amount $\dot{\theta}S$ for the sub-throttle valve 54. If $\theta M < \theta S$ at step 205, on the other hand, no further acceleration slippage will occur at the driven wheels. Thus, the flags FS and Fo are reset to zero at step 210 and step 215, respectively, before the routine ends. In the above determinations, the sub-throttle opening $\theta S$ is determined based on the driving amount for the sub-throttle valve 54 as described later in the routine of FIG. 4B.

In FIG. 4B, at step 220, it is determined whether the flag FS remains set at one. If so, then it is determined at step 230 whether the sub-throttle opening $\theta S$ is equal to or less than the main throttle opening $\theta M$. If $\theta M < \theta S$, the process goes to step 240 where the drive motor 55 rapidly closes the sub-throttle valve 54. If $\theta M \geq \theta S$, on the other hand, the flag Fo is set to one at step 250, and then the drive motor 55 runs at step 255 to move the sub-throttle valve 54 at the control amount (moving speed) $\dot{\theta}S$.

If FS=0 at step 220, it is determined at step 260 whether the sub-throttle valve 54 is fully open, or whether the sub-throttle opening $\theta S$ is less than its maximum opening $\theta SMAX$. If $\theta S < \theta SMAX$, the drive motor 55 rapidly opens the sub-throttle valve 54 at step 270. If $\theta S \geq \theta SMAX$ indicating that the sub-throttle valve 54 is already fully opened, the drive motor 55 stops opening the sub-throttle valve 54 at step 280. After steps 240, 255, 270 and 280, the routine ends.

This embodiment, in summary, starts the sub-throttle valve control as soon as acceleration slippage is detected from the difference between the driven-wheel speed VR and the reference value VS. If the sub-throttle opening $\theta S$, which is adjusted according to the above difference, exceeds the main throttle opening $\theta M$, no further acceleration-slippage control is necessary, thus terminating the sub-throttle valve control.

Figure 5:
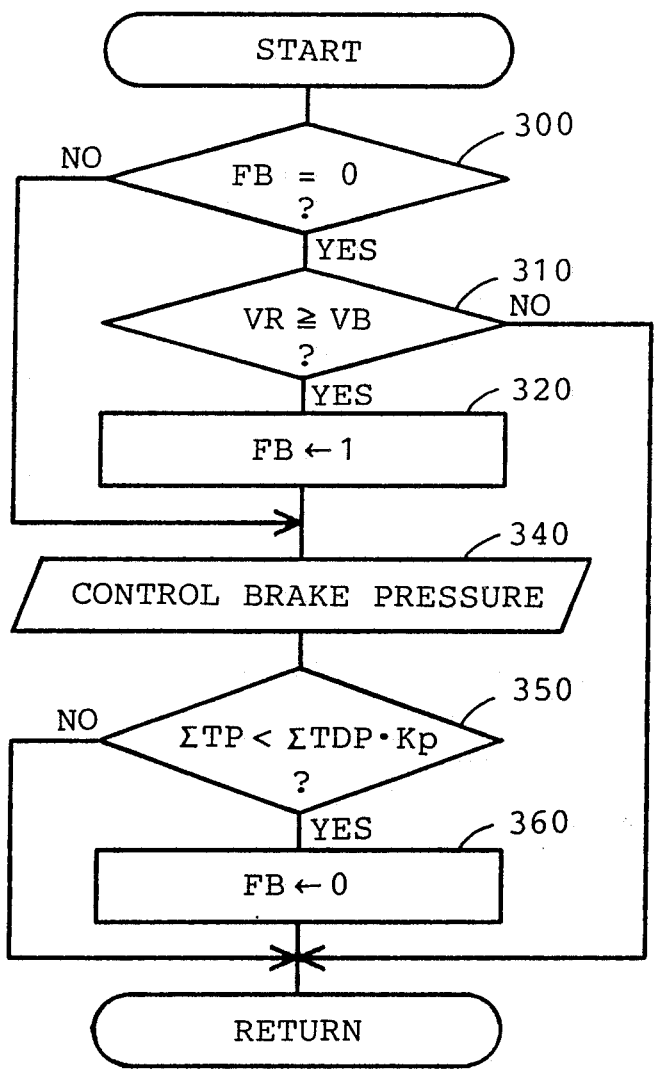
FIG. 5 is a flow chart for a brake control.

FIG. 5 is a flow chart showing a process for the brake control that the acceleration-slippage control circuit 40 repeats in the same time intervals as in its process for calculating the control amount for the sub-throttle valve (FIG. 4A). When the routine in FIG. 5 starts, it is determined at step 300 whether the brake control is under way (i.e., whether the flag FB remains reset at zero).

If FB=0, then it is determined at step 310 whether the condition to start the brake control exists. Specifically, it is determined whether the driven-wheel speed VR exceeds the reference value VB for the brake control. When the condition to start the brake control does not exist at step 310, no further processing is executed. When the condition exists, the flag FB is set to one at step 320, and then the brake control is executed at step 340 according to TABLE 1:

TABLE 1

| speed | acceleration | | |
|---|---|---|---|
| | $\dot{V} < G2$ | $G2 \leq V < G1$ | $G1 \leq \dot{V}$ |
| VB ≦ VR | SD | SU | FU |
| VS ≦ VR < VB | FD | SD | SD |

TABLE 1-continued

| speed | acceleration | | |
|---|---|---|---|
| | $\dot{V} < G2$ | $G2 \leq \dot{V} < G1$ | $G1 \leq \dot{V}$ |
| VR < VS | FD | FD | FD |

In TABLE 1, $\dot{V}$ is an acceleration of the driven wheel, G1 is a positive reference acceleration, G2 is a negative reference acceleration, FU represents the quick increase in the oil pressure in the driven-wheel brake cylinders 9 and 10, and SU, FD, and SD represent the slow increase, quick decrease, and slow decrease of the oil pressure, respectively.

At step 340, driven-wheel acceleration $\dot{V}$ is first calculated based on the driven-wheel speed VR. The oil pressure is increased if the acceleration $\dot{V}$ exceeds G2 and VR≧VB. Otherwise, the oil pressure is decreased. As a result, the brake system promptly reduces the driven-wheel speed.

Then, at step 350, it is determined whether there is no oil pressure. Here the oil pressure is determined to have ceased when the accumulated value ΣTP of the oil-pressure increasing time TP is less than the accumulated value ΣTDP of the oil-pressure decreasing time TDP multiplied by a correction factor Kp. Here the correction Kp is introduced because there is a difference in the rate of change between the increase and the decrease of the oil pressure. When the result at step 350 is YES, brake control is terminated, and the flag FB is reset to 0 at step 360. When the oil pressure has not completely ceased, the result at step 350 is NO, and the routine ends with FB remaining one.

The brake control of this embodiment starts as soon as the driven-wheel speed VR exceeds the reference value VB. This control is continuously executed according to the driven-wheel speed VR and the driven wheel acceleration V until the brake oil pressure completely ceases.

Figure 6:
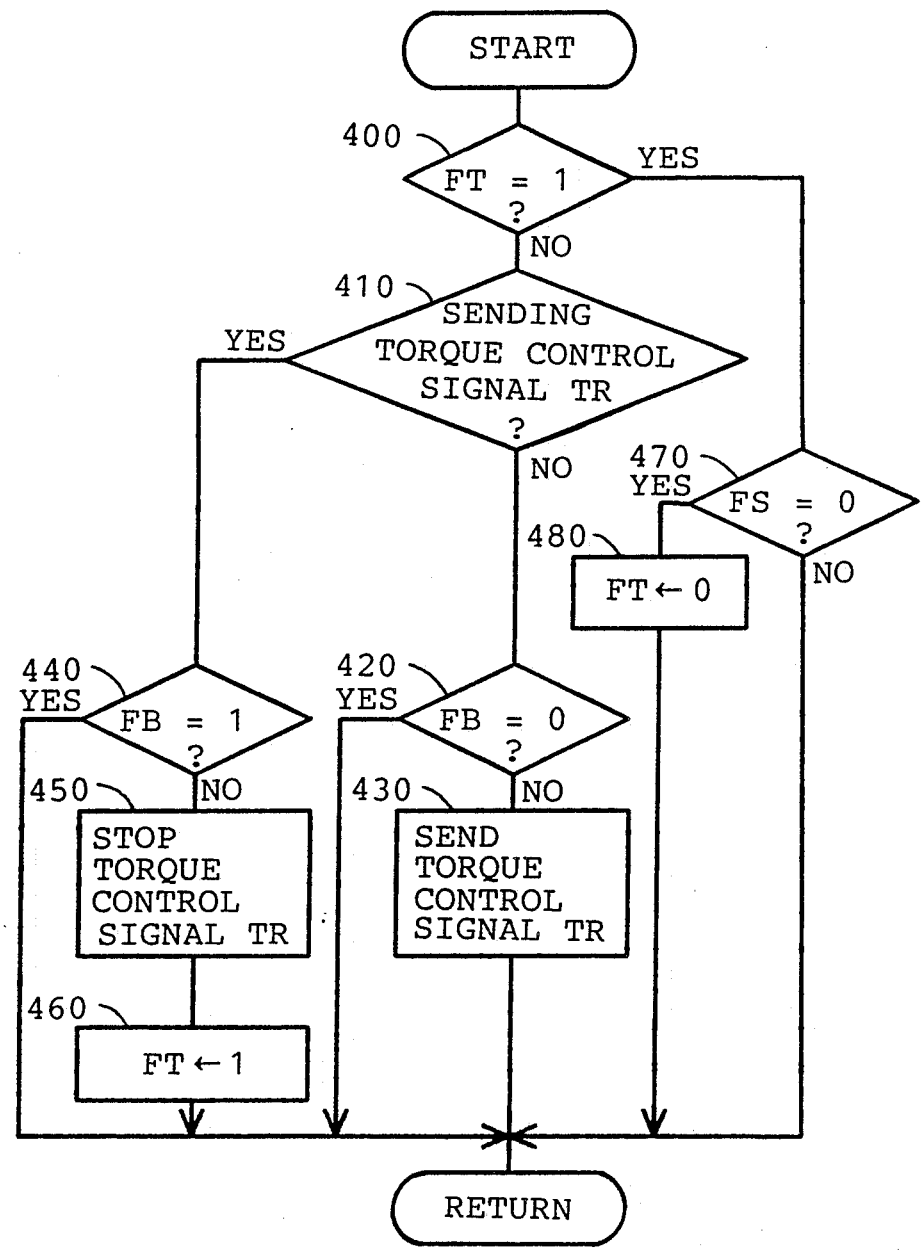
FIG. 6 is a flow chart of a torque-control-signal output routine.

FIG. 6 is a flow chart showing a process for sending a torque control signal, explained later, to the engine control circuit 57 for the instruction on the torque control in the engine 48. This process is repeatedly executed in the acceleration-slippage control circuit 40 in the same time intervals as in the processes shown in FIGS. 4A, 4B, and 5.

When the routine starts, it is determined at step 400 whether the value of a flag FT is one: the flag FT is set to one when the engine control circuit 57 once finishes the torque control after the acceleration-slippage control has started. When FT=0, it is determined at step 410 whether a torque control signal TR is being sent to the engine control circuit 57. When the result at step 410 is NO, the process goes to step 420.

At step 420, it is determined whether the flag FB remains reset in zero. If FB=0, the routine ends. If FB=1 (i.e., when VR≧VB and the brake control is executed), the torque control signal TR is sent to the engine control circuit 57 at step 430.

When it is determined at step 410 that the engine control circuit 57 is receiving the torque control signal TR, it is then determined at step 440 whether the flag FB remains set at one. If FB=1, the routine ends. If FB=0, the torque control signal TR to the engine control circuit 57 is stopped at step 450. Then, after the flag FT is set to one for indicating the completion of the torque control at step 460, the routine ends.

When FT=1 at step 400, it is determined at step 470 whether the flag FS remains set at zero. When FS=0, which indicates that the sub-throttle valve control has already finished, the flag FT is reset to zero at step 480 before the routine ends. When FS=1 at step 470, no further processing follows.

As described above, in the process of sending the torque control signal, the torque control signal TR is sent to the engine control circuit 57 as soon as the driven-wheel speed VR exceeds the reference value VB and the brake control is started. Once the brake control is finished, the flag FT blocks the torque control signal until the sub-throttle valve control is completed, i.e., until the end of the acceleration-slippage control. The torque control signal is, therefore, sent to the engine control circuit 57 only once, in the brake control, during the acceleration-slippage control.

Figure 7:
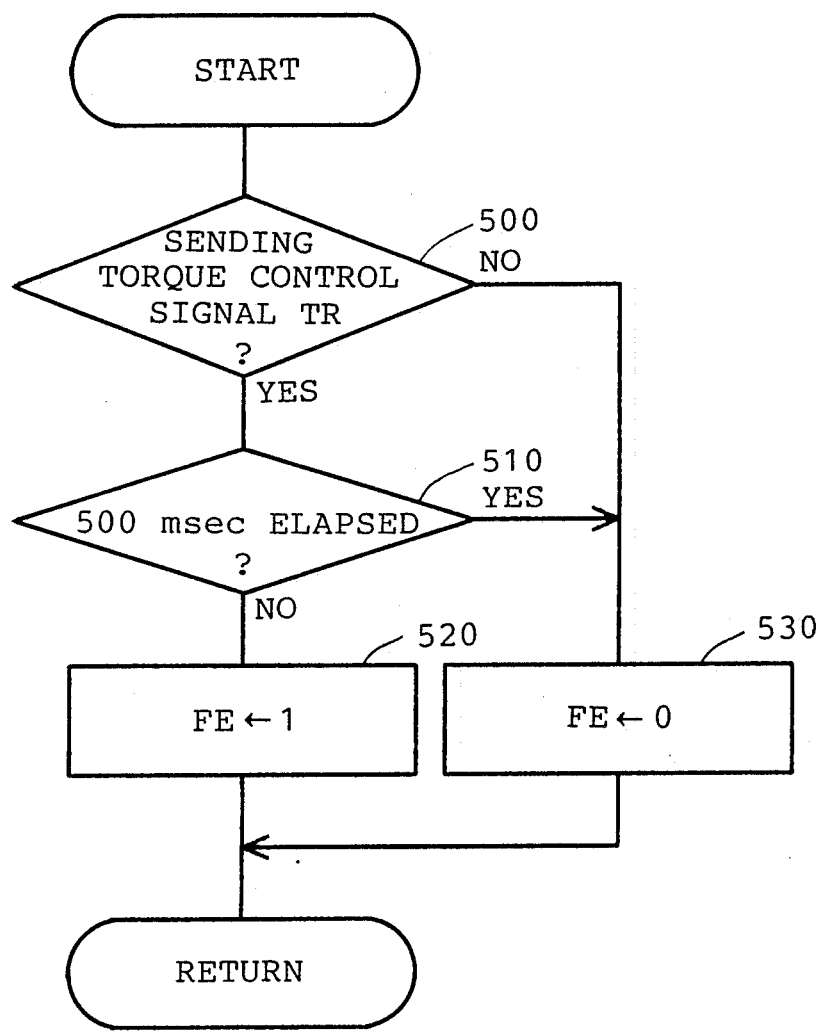
FIG. 7 is a flow chart of a torque-control determination routine.

FIG. 7 is a flow chart showing a process for determining whether the torque control for the engine 48 is to be executed by the engine control circuit 57. This determination is made based on the torque control signal sent from the acceleration-slippage control circuit 40.

The process shown in FIG. 7 is repeated in the engine control circuit 57 together with the fuel injection control and the ignition timing control. When the routine is started, it is determined at step 500 whether the engine control circuit 57 is receiving the torque control signal TR from the acceleration-slippage control circuit 40. If so, it is determined at step 510 whether the torque control signal TR has been sent for a predetermined period (e.g., 500 msec). When the result at step 510 is NO, a flag FE for the execution of the torque control is set to one at step 520. When FE=1, the fuel-injection control and the ignition-timing control are executed as follows: the ignition timing is delayed by a predetermined crank angle and the fuel injection is blocked at some of the cylinders. After step 520, the routine ends.

When it is determined at step 500 that the torque control signal TR has not been sent, or when it is determined at step 510 that the output of the torque control signal TR has continued for the predetermined period, the flag FE is reset at step 530 so that the ignition-timing control and the fuel-injection control are executed following the ordinary method.

In summary, the engine control circuit 57 executes both the ignition-timing delay control and the fuel-reduction control when receiving the torque control signal TR, thus rapidly reducing the output torque of the engine 48. When the output of the torque control signal TR continues longer than the predetermined period, the flag FE for the execution of the torque control is automatically reset regardless of the torque control signal TR, so that the torque control is stopped. Consequently, it prevents the operation of the engine 48 from deteriorating due to excessively long control of the output torque.

FIGS. 9A-9E show the processes and effects of the acceleration-slippage control of this embodiment.

First, as shown in FIG. 9A, the main throttle valve 51 is rapidly opened between the time points t0 and t1 when the accelerator pedal 50 is pressed. When the driven-wheel speed VR (FIG. 9E) exceeds the first reference value VS (time point t3), the sub-throttle valve control starts to close the fully-opened sub-throttle valve 54 (FIG. 9B). As a result of this closing, the amount of the air taken into the engine 48 slowly decreases, thus gradually reducing the output torque. Actually, it takes some time before the output torque of the engine 48 is sufficiently reduced. Thus, the driven-wheel speed VR still rises some even after the sub-throttle valve control starts, as shown in FIG. 9E.

When driven wheel speed VR exceeds the second reference value VB (time point t4), the brake control is started. At the same time, the acceleration-slippage control circuit 40 sends a torque control signal TR (FIG. 9D) to the engine control circuit 57 to start the output torque control of the engine 48. Because of both the output torque control and the brake control, the driven-wheel speed VR promptly starts decreasing, and accordingly the brake oil pressure PB gradually decreases (FIG. 9C). Eventually, the driven-wheel speed VR becomes less than the reference value VB and the oil pressure PB completely ceases (time point t5). At this moment, the brake control and the output torque control stop while the sub-throttle valve control continues for the acceleration-slippage control. If the brake control lasts a long time, the torque control ends after the predetermined period (e.g., 500 msec in this embodiment).

To elaborate, the ignition-timing delay control and the fuel-reduction control stop reducing the output torque of the engine 48 at the time point t5, because the acceleration slippage has sufficiently subsided so that the sub-throttle valve control can independently adjust the output torque. Even if the driven-wheel speed VR rises again and exceeds the reference value VB after the brake control and the output torque control are finished at the time point t5, only the brake control is executed to suppress the driven-wheel speed.

The output torque control for the engine is executed only once, immediately after the occurrence of acceleration slippage of the driven wheel. Thus, the output torque of the engine can be quickly reduced without deteriorating the engine operation. In contrast to the acceleration-slippage controller which executes only the brake control and the throttle-valve control, the controller of this embodiment can prevent an excessive rise of the brake oil pressure, which might cause unexpected oscillation or noise of the vehicle.

FIGS. 10A–10D are given for the comparison of the effects of some control methods on the brake oil pressure. FIG. 10A shows the change of the brake oil pressure in case the acceleration-slippage control is performed by executing only the brake control and the throttle-valve control. The throttle-valve control is so slow to change the output torque of the engine that the output torque cannot be reduced promptly after the occurrence of the acceleration slippage. As a result, the brake oil pressure is excessively raised, resulting in rapid braking of the driven wheels, which causes unexpected oscillation or noise of the vehicle.

According to the present embodiment, on the contrary, the output torque control reduces the output torque of the engine promptly after acceleration slippage occurs, thus preventing an excessive increase in the brake oil pressure as seen in FIGS. 10B, 10C, and 10D. FIG. 10B is a graph showing the case where the torque control blocks the fuel injection into two cylinders out of six in the engine. Similarly, FIG. 10C shows another torque control that blocks the fuel injection into four cylinders out of the six, and FIG. 10D shows still another torque control that delays the ignition timing.

In present embodiment, the output torque control of the engine is executed together with the brake oil pressure control. The output torque control may be also executed, as shown in FIG. 11F, while the driven-wheel speed VR (FIG. 11E) is greater than the reference value VB after the beginning of the acceleration-slippage control Also, as shown in FIG. 11G, the output torque control may be executed from the time point when the acceleration $\dot{V}$ (FIG. 11D) of the driven wheel exceeds a predetermined value G11 until the acceleration $\dot{V}$ becomes less than a predetermined negative value G12. Moreover, as shown in FIG. 11H, it may be executed for a predetermined time period (e.g., 200 msec) after the driven-wheel speed VR exceeds the reference value VB.

In this embodiment, acceleration slippage is reduced by executing the throttle-valve control, the output torque control for the engine, and the brake control for the driven wheel. Also, the present invention can apply to any acceleration-slippage controller other than the above embodiment as long as it has a combination of the throttle-valve control and the output torque control of the engine.

FIG. 12A is a graph showing the driven-wheel speed VR in the case where only the sub-throttle control is executed for the reduction of acceleration slippage. FIGS. 12B–12D show the effects of the acceleration-slippage controller on the driven-wheel speed VR in the case where the throttle-valve control is executed together with one of the output torque control methods that are executed while the driven-wheel speed VR is greater than the reference value VB (FIGS. 11E and 11F).

FIG. 12B shows the driven-wheel speed VR in the case of the torque control method in FIG. 10B, which blocks the fuel injection into two cylinders out of six in the engine. FIG. 12C shows the driven-wheel speed VR in the case of the torque control method in FIG. 10C, which blocks the fuel injection into four cylinders out of the six. FIG. 12D shows the driven-wheel speed VR in the case of the torque control method in FIG. 10D, which delays the ignition timing. These graphs show that when the throttle-valve control is combined with any output torque control, the revolution of the driven wheel is reduced more rapidly than when the throttle-valve control is executed alone.

As many widely different embodiments of this invention may be made without departing from its spirit and scope, the invention is not limited to these specific embodiments except as defined in the appended claims.

What is claimed is:

1. A controller for reducing acceleration slippage of a driven wheel of an automobile with an internal combustion engine, the controller comprising:

a slippage detecting means for detecting slippage of the driven wheel when the automobile is accelerating;

a throttle-valve control means for adjusting an opening of a sub-throttle valve of the engine to reduce the slippage when the detected slippage exceeds a first reference value; and a torque reducing means for reducing an output torque of the engine to reduce the slippage only while the detected slippage exceeds a second reference value which is greater than the first reference value, said torque reducing means being operational for no more than a predetermined period.

2. An acceleration-slippage controller, as in claim 1, where the torque reducing means reduces the output torque by adjusting a fuel amount injected into the engine.

3. An acceleration-slippage controller, as in claim 1, where the controller further comprises a brake controlling means for adjusting brake force of the driven wheel to reduce the slippage when the detected slippage exceeds the second reference value.

4. An acceleration-slippage controller, as in claim 2, where the controller further comprises a brake controlling means for adjusting brake force of the driven wheel to reduce the slippage when the detected slippage exceeds the second reference value.

5. An acceleration-slippage controller, as in claim 3, further comprising means for ensuring the torque reducing means being operational for no more than the predetermined period regardless of continuing slippage of the driven wheel.

6. An acceleration-slippage controller, as in claim 4, further comprising means for ensuring the torque reducing means being operational for no more than the predetermined period regardless of continuing slippage of the driven wheel.

7. An acceleration-slippage controller, as in claim 1, where the torque reducing means reduces the output torque by adjusting an ignition timing of the engine.

8. An acceleration-slippage controller, as in claim 7, where the controller further comprises a brake controlling means for adjusting a brake force of the driven wheel to reduce the slippage when the detected slippage exceeds the second reference value.

9. An acceleration-slippage controller, as in claim 8, further comprising means for providing the torque reducing means being operational for no more than the predetermined period regardless of continuing slippage of the driven wheel.

10. A controller for reducing acceleration slippage of a driven wheel of an automobile with an internal combustion engine, the controller comprising:
  a slippage detecting means for detecting slippage of the driven wheel when the automobile is accelerating;
  a throttle-valve control means for adjusting an opening of a sub-throttle valve of the engine to reduce the slippage when the detected slippage exceeds a first reference value;
  a brake control means for adjusting brake force of the driven wheel to reduce the slippage when the detected slippage exceeds a second reference value which is greater than the first reference value; and
  a torque reducing means for receding an output torque of the engine to reduce the slippage only while the brake control means performs the brake force adjustment and the detected slippage exceeds the second reference value, said torque reducing means being operational for no more than a predetermined period.

11. An acceleration-slippage controller, as in claim 10, where the torque reducing means reduces the output torque by adjusting a fuel amount injected into the engine.

12. An acceleration-slippage controller, as in claim 10, further comprising means for ensuring the torque reducing means being operational for no more than the predetermined period regardless of continuation of the brake force adjustment.

13. An acceleration-slippage controller, as in claim 11, further comprising means for ensuring the torque reducing means being operational for no more than the predetermined period regardless of continuation of the brake force adjustment.

14. An acceleration-slippage controller, as in claim 10, where the torque reducing means reduces the output torque by adjusting an ignition timing of the engine.

15. An acceleration-slippage controller, as in claim 14, further comprising means for providing the torque reducing means being operational for no more than the predetermined period regardless of the continuation of the brake force adjustment.

16. A controller for reducing acceleration slippage of a driven wheel of an automobile with an internal combustion engine, the controller comprising:
  a slippage detecting means for detecting slippage of the driven wheel when the automobile is accelerating;
  a throttle-valve control means for adjusting an opening of a sub-throttle valve of the engine to reduce the slippage when the detected slippage exceeds a first reference value; and
  a torque reducing means for receding an output torque of the engine to reduce the slippage only during a first occurrence period starting when the acceleration of the driven wheel exceeds a positive reference value and ending when the driven wheel acceleration falls below a negative reference value.

17. An acceleration-slippage controller, as in claim 16, where the torque reducing means reduces the output torque by adjusting a fuel amount injected into the engine.

18. An acceleration-slippage controller, as in claim 16, where the torque reducing means reduces the output torque by adjusting an ignition timing of the engine.

19. A controller for reducing acceleration slippage of a driven wheel of an automobile with an internal combustion engine, the controller comprising:
  a slippage detecting means for detecting slippage of the driven wheel when the automobile is accelerating;
  a throttle-valve control means for adjusting an opening of a sub-throttle valve of the engine to reduce the slippage when the detected slippage exceeds a first reference value; and
  a torque reducing means for receding an output torque of the engine to reduce the slippage for only a predetermined period after the detected slippage exceeds a second reference value which is greater than the first reference value.

20. An acceleration-slippage controller, as in claim 19, where the torque reducing means reduces the output torque by adjusting a fuel amount injected into the engine.

21. An acceleration-slippage controller, as in claim 19, where the torque reducing means reduces the output torque by adjusting an ignition timing of the engine.

22. An acceleration-slippage controller, as in claim 20, where the controller further comprises a brake controlling means for adjusting a brake force of the driven wheel to reduce the slippage when the detected slippage exceeds the second reference value.

23. An acceleration-slippage controller, as in claim 21, where the controller further comprises a brake controlling means for adjusting a brake force of the driven wheel to reduce the slippage when the detected slippage exceeds the second reference value.

* * * * *